UNITED STATES PATENT OFFICE.

CHRISTOPHER RIS AND CHARLES SIMON, OF BASLE, SWITZERLAND; ASSIGNORS TO JOHN R. GEIGY & CO., OF SAME PLACE.

PROCESS OF MAKING GREEN TRISAZO DYES.

SPECIFICATION forming part of Letters Patent No. 655,013, dated July 31, 1900.

Application filed April 24, 1900. Serial No. 14,086. (Specimens.)

*To all whom it may concern:*

Be it known that we, CHRISTOPHER RIS and CHARLES SIMON, citizens of the Swiss Confederation, residing at Basle, Switzerland, have invented certain new and useful Improvements in Processes of Making Green Trisazo Coloring-Matters, of which the following is a specification.

This invention relates to the production of new green trisazo colors by means of orthochloraniline. Orthochloraniline is first diazotized and combined with alpha$_1$ alpha$_4$ amidonaphtol beta$_2$ beta$_3$ disulphoacid, and the thus-formed monoazo compound then combined with one molecule of a tetrazo compound, such as tetrazodiphenyl, tetrazoditolyl, tetrazodiphenolether, and one molecule of a phenol, such as phenol, orthocresol, salicylic acid, orthocresotinicacid.

The new green coloring-matters have the following formula:

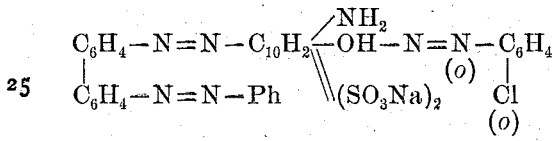

wherein Ph signifies phenol and its above-mentioned derivatives.

Example I: 12.8 kilograms of orthochloraniline are dissolved in five hundred liters of water with thirty kilograms of hydrochloric acid 21° Baumé. Then ice is added to maintain the temperature at 0° centigrade, and the solution is diazotized with seven kilograms of nitrite of sodium. The diazo compound is then introduced into a neutral solution of thirty-two kilograms of alpha$_1$ alpha$_4$ amidonaphtol beta$_2$ beta$_3$ disulphoacid in about five hundred liters of water. After stirring for some hours the monoazo compound is combined with a solution of tetrazodiphenyl obtained from 18.4 kilograms of benzidine in the well-known manner, to which are first added fifty kilograms of carbonate of sodium. The intermediate compound is immediately formed as a black precipitate. Then a solution of 9.4 kilograms of phenol with five kilograms of caustic soda in one hundred liters of water is added, and after stirring for one hour the combination is heated to 90° centigrade. Then the coloring-matter is precipitated by common salt, filtered, pressed, and dried.

Example II: 18.4 kilograms of benzidine are tetrazotized in the well-known manner. Then are added fifty kilograms of carbonate of sodium and 14.5 kilograms of salicylic acid, dissolved with six kilograms of carbonate of sodium in one hundred liters of water. After stirring for some hours the formation of the intermediary compound is finished. Then a solution of forty-five kilograms of the azo compound from diazotized orthochloraniline and alpha$_1$ alpha$_4$ amidonaphtol beta$_2$ beta$_3$ disulphoacid (obtained as described in Example I) is added and then further proceeded according to Example I.

The new coloring-matters form dark powders with greenish-bronzy luster, easily soluble in water with a dark-green color and soluble in concentrated sulphuric acid with violet-black to blue-black color, difficultly soluble in alcohol, insoluble in ether and benzene. By complete reduction, such as with zinc-dust and hydrochloric acid, a colorless solution is obtained from which orthochloraniline may be regenerated by distilling the solution, which is previously alcalized with soda.

The color dyes unmordanted cotton and mixed goods in green shades.

Having thus described our invention, what we claim as new, and desire to secure by Letters Patent, is—

1. The herein-described process of producing green coloring-matters, which consists in combining one molecule of the monoazo color, obtained from diazotized orthochloraniline and alpha$_1$ alpha$_4$ amidonaphtol beta$_2$ beta$_3$ disulphoacid, with one molecule of a tetrazo compound and one molecule of a phenol compound, substantially as set forth.

2. The new green coloring-matter thus obtained, which forms a dark powder with greenish-bronzy luster, easily soluble in water with green color, soluble in concentrated sulphuric acid with dark-violet to blue-black color, difficultly soluble in alcohol, insoluble in ether and benzene, forming by complete reduction a colorless solution from which orthochloraniline may be regenerated, and dyeing unmordanted cotton green shades, substantially as set forth.

In testimony that we claim the foregoing as our invention we have signed our names in presence of two subscribing witnesses.

CHRISTOPHER RIS.
CHARLES SIMON.

Witnesses:
GEORGE GIFFORD,
ALBERT GRAETER.